United States Patent [19]

Cassidy et al.

[11] Patent Number: 5,159,519
[45] Date of Patent: * Oct. 27, 1992

[54] DIGITAL CIRCUIT INTERRUPTER WITH AN IMPROVED SAMPLING ALGORITHM

[75] Inventors: Alice E. Cassidy, Hartford; Robert J. Danek, Andover, both of Conn.

[73] Assignee: General Electric Company, New York, N.Y.

[*] Notice: The portion of the term of this patent subsequent to Jun. 9, 2004 has been disclaimed.

[21] Appl. No.: 666,960

[22] Filed: Mar. 11, 1991

[51] Int. Cl.⁵ .................................. H02H 3/00
[52] U.S. Cl. ........................ 361/96; 361/97; 364/483
[58] Field of Search .............. 361/94, 93, 96, 97, 361/42, 47; 364/483, 492

[56] References Cited

U.S. PATENT DOCUMENTS

| | | | |
|---|---|---|---|
| 4,319,329 | 3/1982 | Girgis | 364/484 |
| 4,589,052 | 5/1986 | Dougherty | 361/94 |
| 4,672,501 | 6/1987 | Bilac et al. | 361/96 |
| 4,728,914 | 3/1988 | Morris et al. | 335/6 |
| 4,754,247 | 6/1988 | Raymont et al. | 335/202 |
| 4,804,916 | 2/1989 | Frank | 323/300 |
| 4,870,531 | 9/1989 | Danek | 361/93 |
| 4,991,042 | 2/1991 | Tokarski et al. | 361/93 |

Primary Examiner—Steven L. Stephan
Assistant Examiner—Adolf Berhane
Attorney, Agent, or Firm—Richard A. Menelly

[57] ABSTRACT

A digital circuit interrupter having a keypad and display for entering and viewing the trip parameters utilizes a sampling algorithm to periodically sample the current within a protected circuit. The sampling algorithm allows a real time constant sampling interval independent of wide variations in the power system frequency.

9 Claims, 3 Drawing Sheets

DIGITAL CIRCUIT INTERRUPTER WITH AN IMPROVED SAMPLING ALGORITHM

BACKGROUND OF THE INVENTION

This invention relates to solid state circuit interrupters employing digital electronic trip units. One such solid state circuit interrupter is described within U.S. Pat. No. 4,589,052. Electronic trip units are used in such circuit interrupters and are capable of acting on a number of programmed setpoint trip parameters to interrupt the circuit being protected in a timely manner. One such electronic trip unit which allows for user interaction and which provides capability both to select trip parameters and to view the selected trip parameters is found within U.S. Pat. No. 4,672,501.

For purposes of reducing cost while maintaining accuracy and functionality of the electronic trip units, microprocessors are being employed to gather information, process the information, and provide a means of monitoring the information using associated digital circuity. The use of such microprocessors allows more protection functions to be contained in smaller-sized packages. Smaller-sized circuit interrupters because of limited space requirements do not contain the means required to enter data or to view the data being processed. The user-interfaces employed on larger-sized molded case circuit interrupters typically consist of rotatable switches with associated printed indicia to indicate the relative switch positions. The amount of area available on the front panel of such circuit interrupters is also limited and hence reduces the number of optional features requiring such switches.

U.S. Pat. No. 4,870,531 entitled "Circuit Breaker with Removable Display and Keypad", which Patent is incorporated herein for reference purposes, describes a user-interface unit that contains display capability for all possible circuit interrupter options by means of software located solely within the trip unit microprocessor while only displaying those parameters for which the electronic trip unit is configured.

U.S. Pat. No. 4,991,042 entitled "Digital Circuit Interrupter with Keypad Data Entry and Display" describes a circuit interrupter utilizing a digital keypad and display in combination with an electronic trip unit to enter and display the setpoint trip parameters. In determining the current and voltage values within the protected circuit for overcurrent and undervoltage calculations, a sampling algorithm is employed to periodically sample the current and voltage data on a continuous basis such as described within aforementioned U.S. Pat. No. 4,672,501. The sampling frequency for the sampling algorithm was provided by a fixed timer that is calculated to correspond with the 60 $H_z$ power system frequency. When the power system frequency operates at 60 $H_z$, the sampling software is synchronized with the operating frequency in an endless loop by means of a fixed timer. In some industrial distribution circuits, the power system frequency can vary from 40 to 80 $H_z$ such that the software loop no longer corresponds to the fixed 60 $H_z$ cycle generated by the fixed timer.

Accordingly, one purpose of the invention is to provide an electronic trip circuit interrupter having digital data entry and display wherein the operating software's endless loop period within the trip unit depends on the actual operating frequency of the circuit in real time rather than a predetermined fixed time interval.

SUMMARY OF THE INVENTION

A circuit interrupter having an electronic trip unit further includes a digital keypad and display for entering and viewing the circuit trip parameters. The operating programs within the trip unit are controlled by a variable loop time control sampling algorithm that automatically synchronizes to the power system operating frequency.

DESCRIPTION OF THE PREFERRED EMBODIMENT

Figure 1:
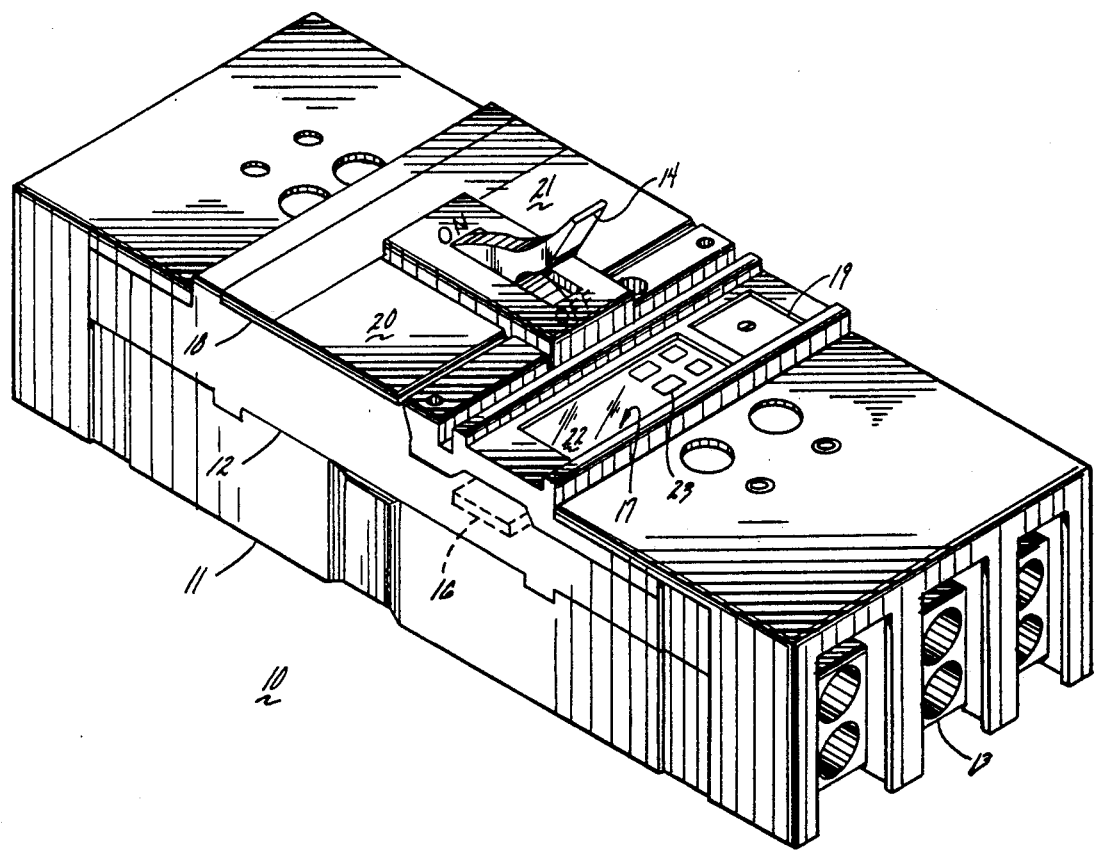
FIG. 1 is a top perspective view of a digital circuit interrupter containing the improved sampling algorithm in accordance with the invention.
Figure 2:
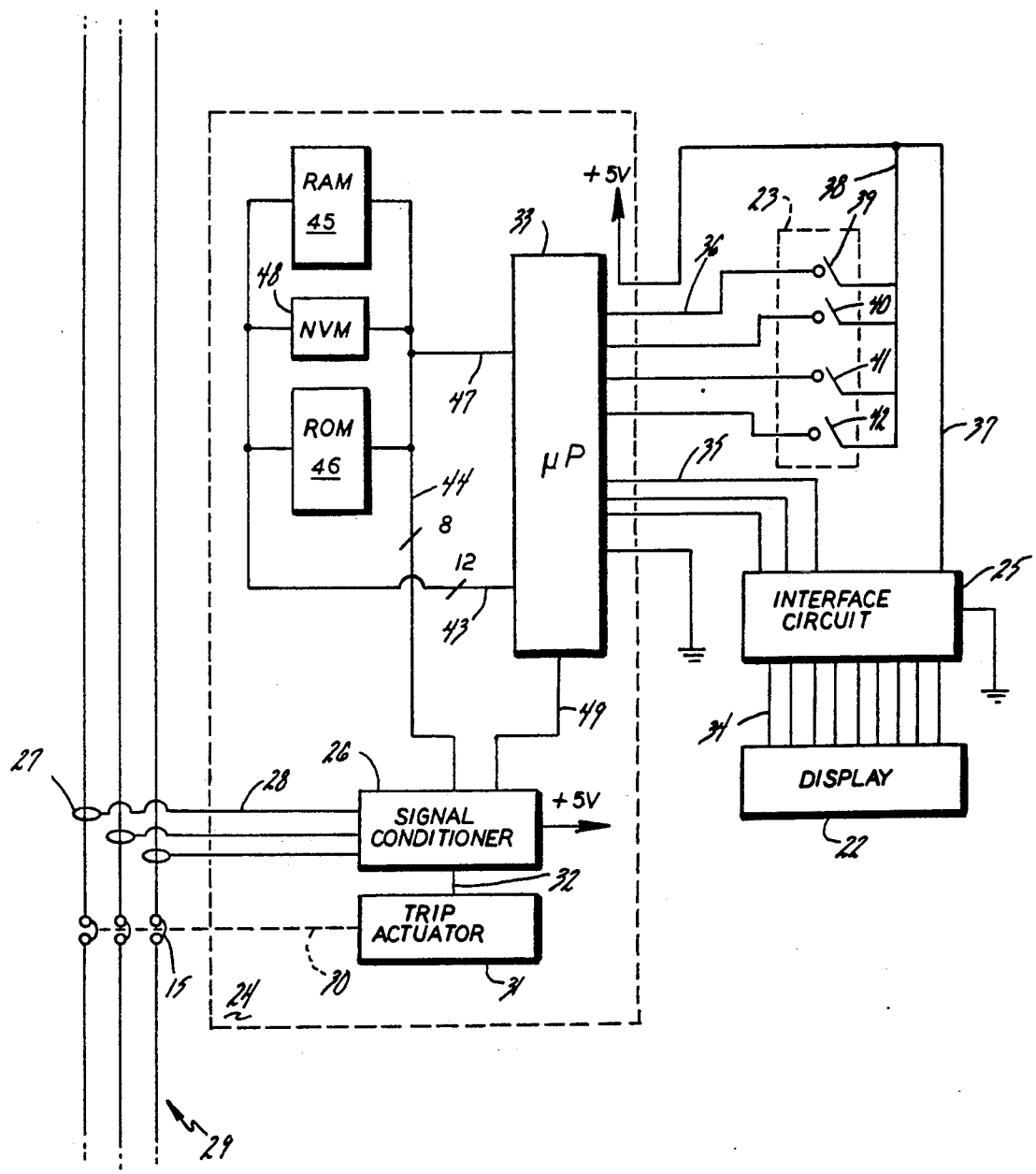
FIG. 2 is a diagrammatic representation of the trip unit and display circuits used within the circuit interrupter of FIG. 1.

A circuit breaker employing an electronic trip unit is depicted at 10, in FIG. 1. The digital circuit breaker includes a circuit breaker case 11 closed by a circuit breaker cover 12 and electrical connection is made with the circuit breaker by means of the load terminals 13 at one end and through corresponding line terminals at the opposite end (not shown). An operating handle 14 provides manual intervention to open the circuit breaker contacts 15 (FIG. 2) which are otherwise automatically controlled by means of an electronic trip unit 16 which trip unit is contained within the circuit breaker cover. A separate accessory cover 18 is attached to the circuit breaker cover and includes one recess for receiving the keypad and display unit 17 and a separate recess for receiving the rating plug 19. A good description of the function of the accessory cover is found within U.S. Pat. No. 4,754,247 and the rating plug is described within U.S. Pat. No. 4,728,914. The accessory cover includes two accessory doors 20, 21 which provide access to at least one accessory and to the trip actuator unit contained within the circuit breaker cover as described within aforementioned U.S. Pat. No. 4,754,247. The keypad and display unit 17 comprises a display 22 and a keypad 23 which interconnect with the trip unit. The trip unit circuit 24 is similar to that described within aforementioned U.S. Pat. No. 4,870,531 and is shown in FIG. 2 wherein the ROM 46, which contains the operational programs for the microprocessor 33, connects with the microprocessor over buses 43, 47 and wherein the RAM 45 and NVM 48 which contain the data processed within the microprocessor also connect with the microprocessor over bus conductors 43, 47. The trip unit circuit interconnects with a three-phase industrial power circuit generally shown at 29 by means of three current transformers 27, signal conditioner circuit 26, corresponding conductors 28 and bus conductors 44, 49. Although not shown, corresponding potential transformers connected to signal conditioner 26 are used to measure the system voltage. The signal conditioner circuit 26 generates both the 5 volt operating power and the analog to digital conversion of the current and voltage through the power circuit 29. The signal conditioner 26 also measures the number of samples between zero crossings of the currents and voltages. Upon the occurrence of an overcurrent condition for a predetermined period of time, a trip signal is communicated to the signal conditioner circuit 26 over bus conductor 49 by the microprocessor. The trip signal is output over wire conductor 32 from the signal conditioner 26 to the trip actuator 31 which operably connects with the contacts 15 by means of the wire conductor 30. As described within aforementioned U.S. Pat. No. 4,870,531, an interface circuit 25 interconnects between microprocessor 33 and the display 22 by means of wire conductors 34, 35. Power is provided to the interface circuit 25 and keypad 23 by means of conductor wires 37, 38. The keypad connects with the microprocessor over wire conductors 36 and the interface circuit connects with the microprocessor over wire conductors 35 as indicated. The keypad includes four switches (39-42) which operate as the "FUNCTION", "VALUE", "SELECT" and "ENTER" (F,V,S,E) keys. Each of the keys provides a logic level to the microprocessor in the event the key is closed. The software operating in the microprocessor senses the logic level of each key and determines operation of the display in the manner described within the aforementioned U.S. Pat. No. 4,991,042.

Figure 3:
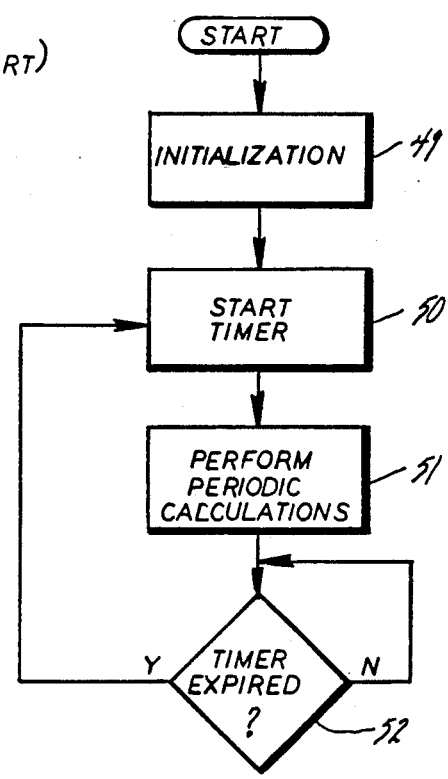
FIG. 3 is a flow chart representation of a sampling algorithm in accordance with the prior art.

The sampling algorithm used within the aforementioned U.S. Pat. No. 4,672,501 is depicted at 58 in FIG. 3. A fixed timer within the microprocessor which is set at 8 milliseconds is initialized (49) and the timer is started (50). The periodic calculations for various electric circuit parameters such as current and voltage RMS values, for example, is performed (51) and a determination is made as to whether the timer is expired (52). If the timer is expired, the timer is again started and the loop 50-52 is continued. In the event that the timer is not expired after the calculations are performed, the timer is allowed to expire before being restarted and continuing the loop (50-52). The 8 millisecond time interval corresponds to a loop time of one-half cycle of the AC wave form of current or voltage when the power system frequency is operating at 60 $H_z$. If the power system frequency increases or decreases, the timer should be continually adjusted to correct for the change in the timing interval based on predetermined loop time for a given frequency.

Figure 4:
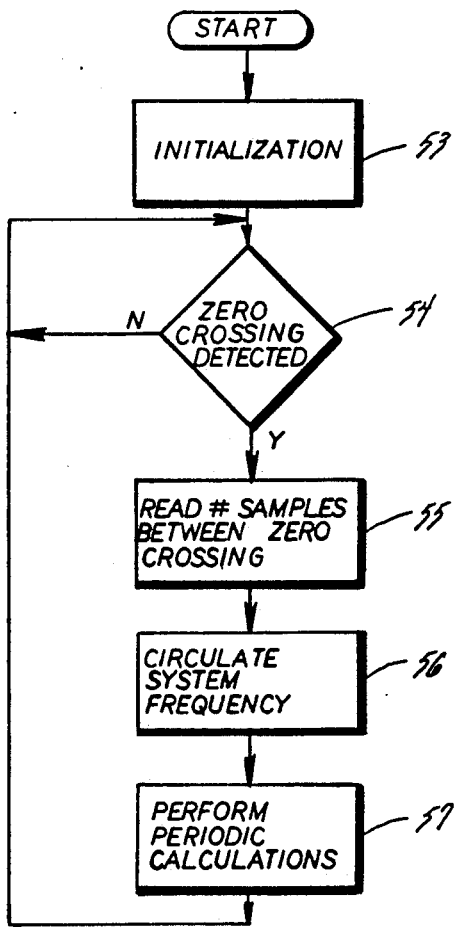
FIG. 4 is a flow chart representation of the sampling algorithm according to the invention.

The sampling algorithm 59 depicted in FIG. 4 provides a variable loop time control wherein the execution time directly depends on the actual power circuit frequency rather than a fixed time interval. The algorithm accordingly allows the operating software within the microprocessor to precisely synchronize with the power system frequency in real time by waiting for a zero crossing to occur in one of the measured AC parameters. The power system frequency can accordingly vary from as much as 40-80 $H_z$ without affecting the accuracy of the sampling loop. The actual power system frequency is determined by counting the number of samples taken between zero crossings of the power system voltage or current wave form from one phase in a three-phase system, or from the single operating phase in a single-phase system and determining operating frequency based on this number of samples. The frequency is calculated from the number of samples between zero crossings using the following relationship:

$$f = \frac{1}{2 \times \text{no. of samples} \times 256 \text{ ms/sample}}$$

This value is averaged over time since the number of samples is an integral which does not always correspond to the exact frequency. Upon start-up, the microprocessor is initialized (53) and a determination is made as to whether a zero crossing of the power system frequency AC wave form has occurred (54) by determining a negative-to-positive or a positive-to-negative sign change. If so, the number of samples between zero crossings of the wave form is determined (55) the actual power system frequency is calculated (56) and the periodic calculations are performed (57). If the number of samples is outside the range of 40-80 $H_z$, the previous half cycle number of samples is used for the frequency calculation until the next valid zero crossing count is read.

An electronic circuit interrupter utilizing a solid state trip unit which includes a microprocessor, is provided with a sampling algorithm to reliably determine the electrical parameters within an associated electrical power distribution circuit whereby the sampling frequency is synchronized to the power system frequency for real time determination of the electrical parameters.

Having thus described our invention, what we claim as new and desire to secure by Letters Patent is:

1. An electronic circuit interrupter comprising:
   a molded plastic case and a molded plastic cover;
   a pair of separable contacts within said case arranged for automatic separation upon occurrence of an overcurrent condition through said contacts;
   an electronic trip unit within said cover and arranged for electrical connection with an associated electric power distribution circuit operating at a power system frequency defining a power system frequency wave form, said electronic trip unit including a microprocessor, said microprocessor containing a sampling algorithm determining periodic time increments, said time increments beginning and ending at each zero crossing of said power system frequency wave form;
   current sensing means connecting with said power distribution circuit and said microprocessor arranged for transmitting circuit current parameters to said microprocessor at periodic controlled time increments, said sampling algorithm determines whether said power system wave form has crossed said zero axis and if so begins to input said circuit current parameters to said microprocessor; and
   a ROM connected with said microprocessor storing operating programs for said microprocessor.

2. The circuit interrupter of claim 1 including a RAM connected with said microprocessor storing operational setpoints controlling said automatic separation of said contacts.

3. The circuit interrupter of claim 1 including an NVM connected with said microprocessor storing setpoint values, said setpoint values being displayed and augmented without effecting said automatic contact separation.

4. The circuit interrupter of claim 1 including a keypad and display unit within a recess formed within said cover, said keypad and display unit being connected with said trip unit for inputting operational setpoints to said microprocessor, said operational setpoints determining said automatic contact separation.

5. The circuit interrupter of claim 1 wherein said sampling algorithm takes a predetermined number of samples, counts further samples between zero crossing counts, and inputs said further samples to said microprocessor after said predetermined number of samples have been taken.

6. The circuit interrupter of claim 1 wherein said keypad comprises a SELECT key, a VALUE key, an ENTER key and a FUNCTION key, each of said keys connecting with said microprocessor through a corresponding ON-OFF switch.

7. The circuit interrupter of claim 3 including an accessory cover attached to said cover, said accessory cover including a slot circumferentially surrounding said keypad and display unit.

8. The circuit interrupter of claim 1 wherein said ROM further contains frequency calculation and loop timing algorithms.

9. An electronic circuit interrupter comprising:
a molded plastic case and a molded plastic cover;
a pair of separable contacts within said case arranged for automatic separation upon occurrence of an overcurrent condition through said contacts;
an electronic trip unit within said cover and arranged for electrical connection with an associated electric power distribution circuit operating at a power system frequency defining a power system frequency wave form, said electronic trip unit including a microprocessor and an A/D converter, said microprocessor containing a sampling algorithm determining periodic time increments, said time increments beginning and ending at each zero crossing of said power system frequency wave form;
current sensing means connecting with said power distribution circuit and said microprocessor through said A/D conversion, said current sensing means arranged for transmitting circuit current parameters to said microprocessor at periodic controlled time increments, said sampling algorithm determines whether said power system wave form has crossed said zero axis and if so begins to input said circuit current parameters to said microprocessor; and
a ROM connected with said microprocessor storing operating programs for said microprocessor.

* * * * *